(12) United States Patent
Biggs et al.

(10) Patent No.: US 7,862,098 B2
(45) Date of Patent: Jan. 4, 2011

(54) VEHICLE INTERIOR ASSEMBLY

(75) Inventors: Christopher James Biggs, New Hudson, MI (US); Michael Eberlein, Plymouth, MI (US)

(73) Assignee: Nissan North America, Inc., Franklin, TN (US)

( * ) Notice: Subject to any disclaimer, the term of this patent is extended or adjusted under 35 U.S.C. 154(b) by 66 days.

(21) Appl. No.: 12/393,784

(22) Filed: Feb. 26, 2009

(65) Prior Publication Data

US 2010/0213730 A1 Aug. 26, 2010

(51) Int. Cl.
*B60R 7/00* (2006.01)
(52) U.S. Cl. ........................................ 296/37.8; 296/70
(58) Field of Classification Search ................ 296/1.08, 296/37.8, 70, 146.7, 187.05, 24.34, 153
See application file for complete search history.

(56) References Cited

U.S. PATENT DOCUMENTS 6,158,802 A 12/2000 Akagi et al.
2008/0001422 A1* 1/2008 Kwolek .................... 296/24.34
2008/0272611 A1* 11/2008 Gidcumb .................... 296/1.08

FOREIGN PATENT DOCUMENTS

| EP | 1 352 774 B1 | 1/2007 |
| JP | H08-011583 A | 1/1996 |
| JP | 2006-290016 A | 10/2006 |

* cited by examiner

*Primary Examiner*—Lori L Lyjak
(74) *Attorney, Agent, or Firm*—Global IP Counselors, LLP (57) ABSTRACT

A vehicle interior assembly includes an interior panel and trim panel. The interior panel includes an opening and a mating part. The trim panel is snap-fitted into the opening of the interior panel and includes a main body. An accessory opening is provided in the main body adjacent to a first end thereof. The accessory opening is configured to receive an accessory adaptor that is insertable and removable perpendicularly to the first direction of the main body. A retention tab extends away from the first end of the main body along a section of a concealed surface of the interior panel adjacent to the opening and prevents movement of the trim panel perpendicularly to the first direction of the main body. A snap-fit part is releasably secured to the mating part of the interior panel portion.

20 Claims, 10 Drawing Sheets

VEHICLE INTERIOR ASSEMBLY

BACKGROUND OF THE INVENTION

1. Field of the Invention

The present invention relates to a vehicle interior assembly. More specifically, the present invention relates to an interior assembly that includes a trim panel with an electric power outlet where the trim panel is dimensioned to withstand forces associated with repeated insertion and removal of a power adaptor of an electrically powered accessory.

2. Background Information

In recent years, the use of electrically powered accessories in a vehicle has become more and more prevalent. Such electrically powered accessories include global positioning systems (GPS), mobile telephone powering devices, handheld music playing devices, personal computers, etc. Such accessories are typically battery powered. However, when the battery needs charging, vehicle operators and passengers rely on power adaptors to charge the batteries of the accessory. These power adaptors are provided with a plug dimensioned to fit into a cigarette lighter of a vehicle.

With the rise in use of such power adaptors and the decline of smoking within vehicles, cigarette lighters have been replaced with power outlets that have generally the same dimensions as conventional cigarette lighters, but do not typically include cigarette lighting heating elements. The power outlet or outlets are typically installed to a trim panel of the dashboard of the vehicle. Power outlets are also provided in various locations throughout the vehicle. For instance, a power outlet can be installed in a center console between the front seats, on a rear passenger door of the vehicle and/or in a rear cargo area of the vehicle, depending upon the vehicle design and passenger needs.

In order for the power adaptors to remain in electrical contact with the outlet(s), the power adaptors are typically provided with a spring biased member or some sort of friction producing element. As a result, a predetermined amount of force is required to insert the power adaptor into the outlet and remove the power adaptor from the outlet. The level of force required for insertion and removal of the power adaptor from the outlet is typically much greater than the forces required to use a traditional cigarette lighter.

In view of the above, it will be apparent to those skilled in the art from this disclosure that there exists a need for an improved vehicle interior assembly and associated trim panel(s) that can withstand the forces required to insert and remove a power adaptor from an electrically powered outlet. This invention addresses this need in the art as well as other needs, which will become apparent to those skilled in the art from this disclosure.

SUMMARY OF THE INVENTION

One object of the present invention is to provide a trim panel and corresponding interior assembly with sufficient strength to withstand the forces associated with repeated insertion and removal of a power adaptor installed on the trim panel.

In accordance with one aspect of the present invention, a vehicle interior assembly includes an interior panel portion and a trim panel. The interior panel portion has an exposed surface and a concealed surface when the interior panel portion is installed within a passenger compartment. The interior panel portion also includes an opening and a mating part. The trim panel is snap-fitted into the opening of the interior panel portion and includes a main body, an accessory opening, a retention tab and a snap-fit part. The main body extends in a first direction between a first end and a second end opposite the first end of the main body. The accessory opening is provided in the main body adjacent to the first end. The accessory opening is configured to receive an accessory adaptor of a vehicle accessory that is insertable and removable from the accessory opening perpendicularly to the first direction of the main body. The retention tab extends away from the first end and along a section of the concealed surface of the interior panel portion adjacent to the opening and prevents movement of the trim panel perpendicularly to the first direction of the main body in response to at least one of insertion and removal of the accessory adaptor. The snap-fit part is releasably secured to the mating part of the interior panel portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
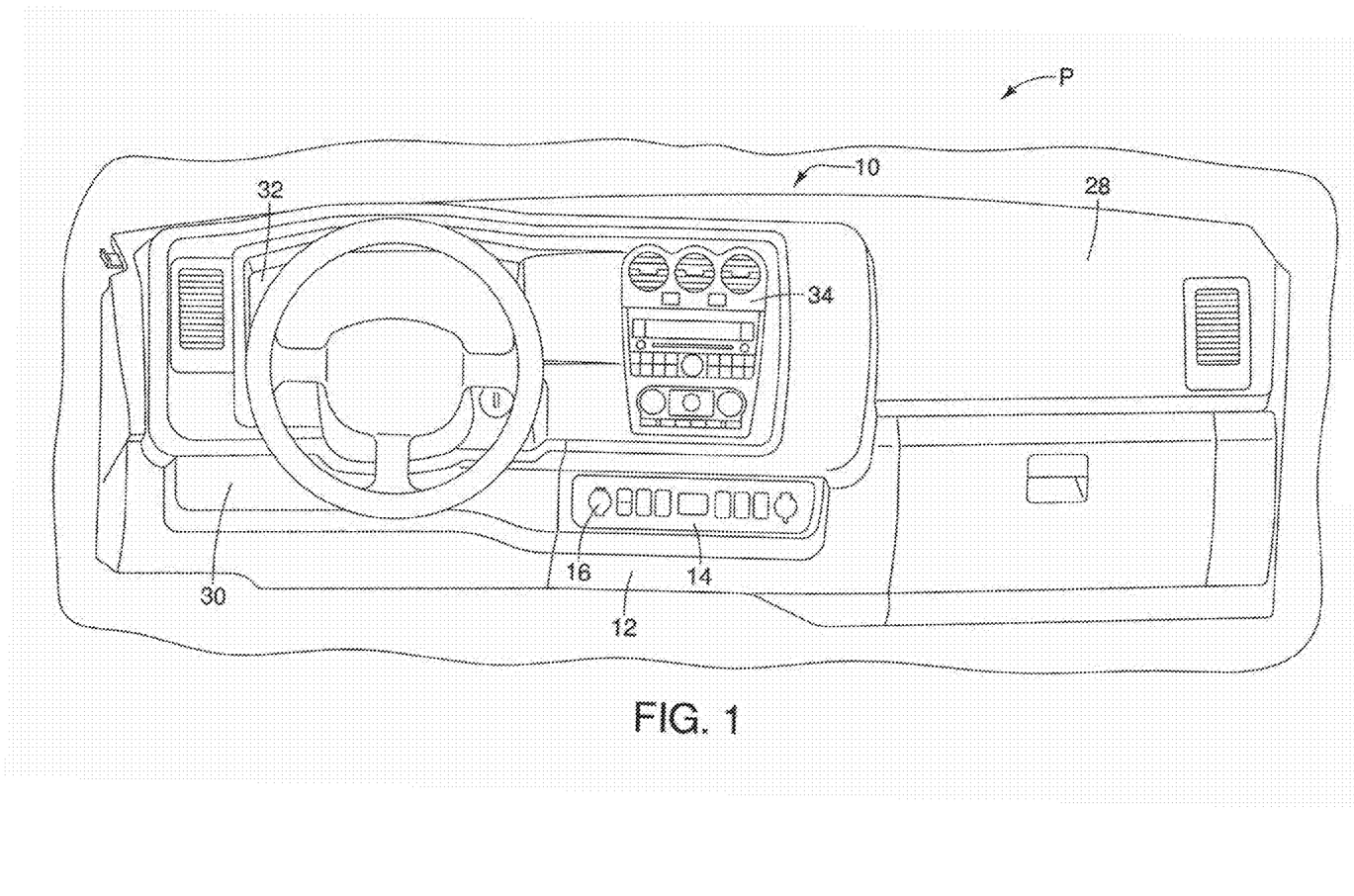
FIG. 1 is an elevational view of an interior of a vehicle, showing a vehicle interior assembly that includes a trim panel having an electric power outlet installed in the trim panel in accordance with the present invention.
Figure 2:
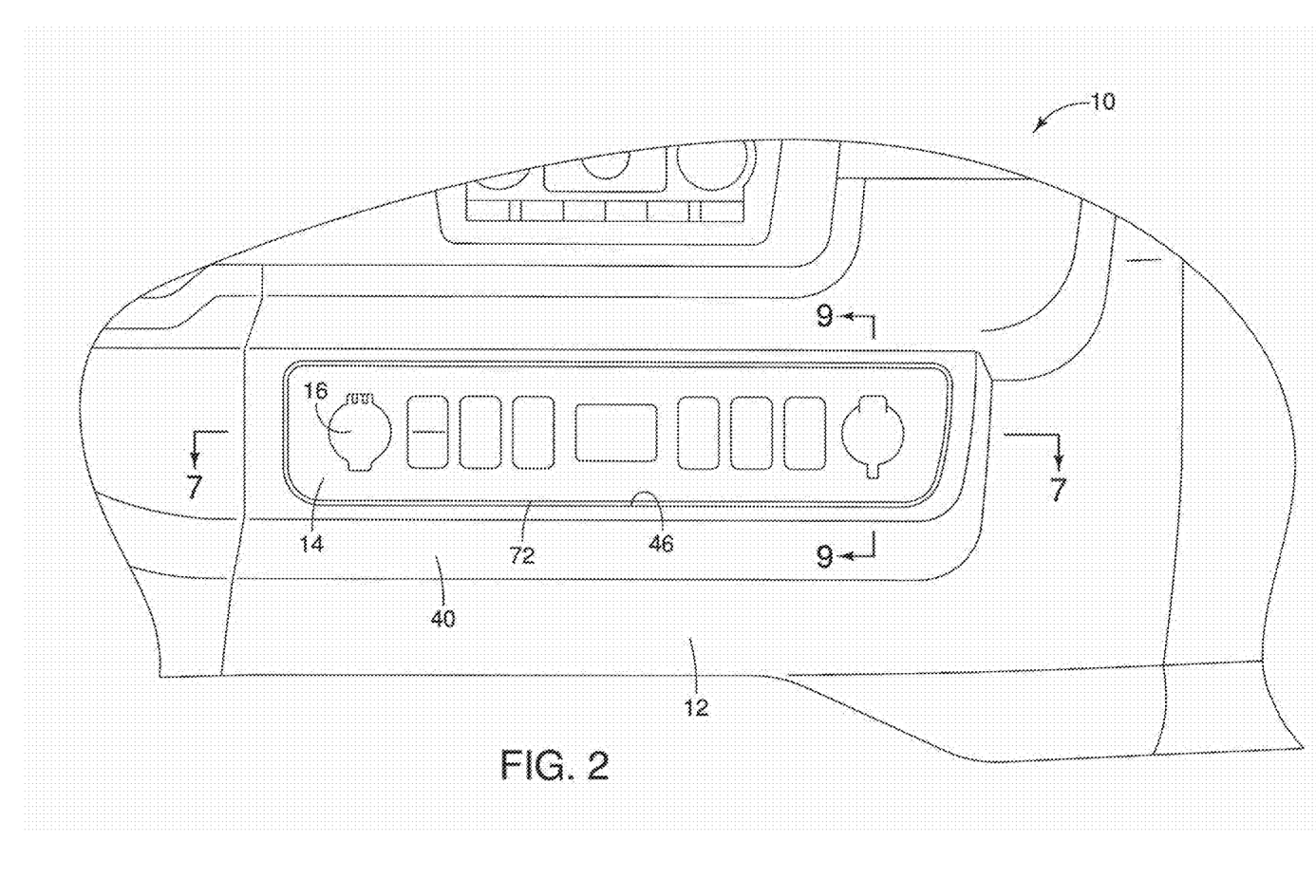
FIG. 2 is another elevational view of the vehicle interior assembly showing the trim panel and the electric power outlet in accordance with the present invention.

Referring initially to FIG. 1, a passenger compartment P of a vehicle is illustrated having a vehicle interior assembly 10 that includes an interior panel portion 12 and a trim panel 14 in accordance with a first embodiment of the present invention. The trim panel 14 includes an electric power outlet 16.

The power outlet 16 is preferably an electricity-supplying vehicle outlet that is similar to a conventional cigarette lighter. More specifically, the power outlet 16 is configured to supply electricity to power a vehicle accessory in a manner similar to that provided by a traditional vehicle cigarette lighter.

Figure 6:
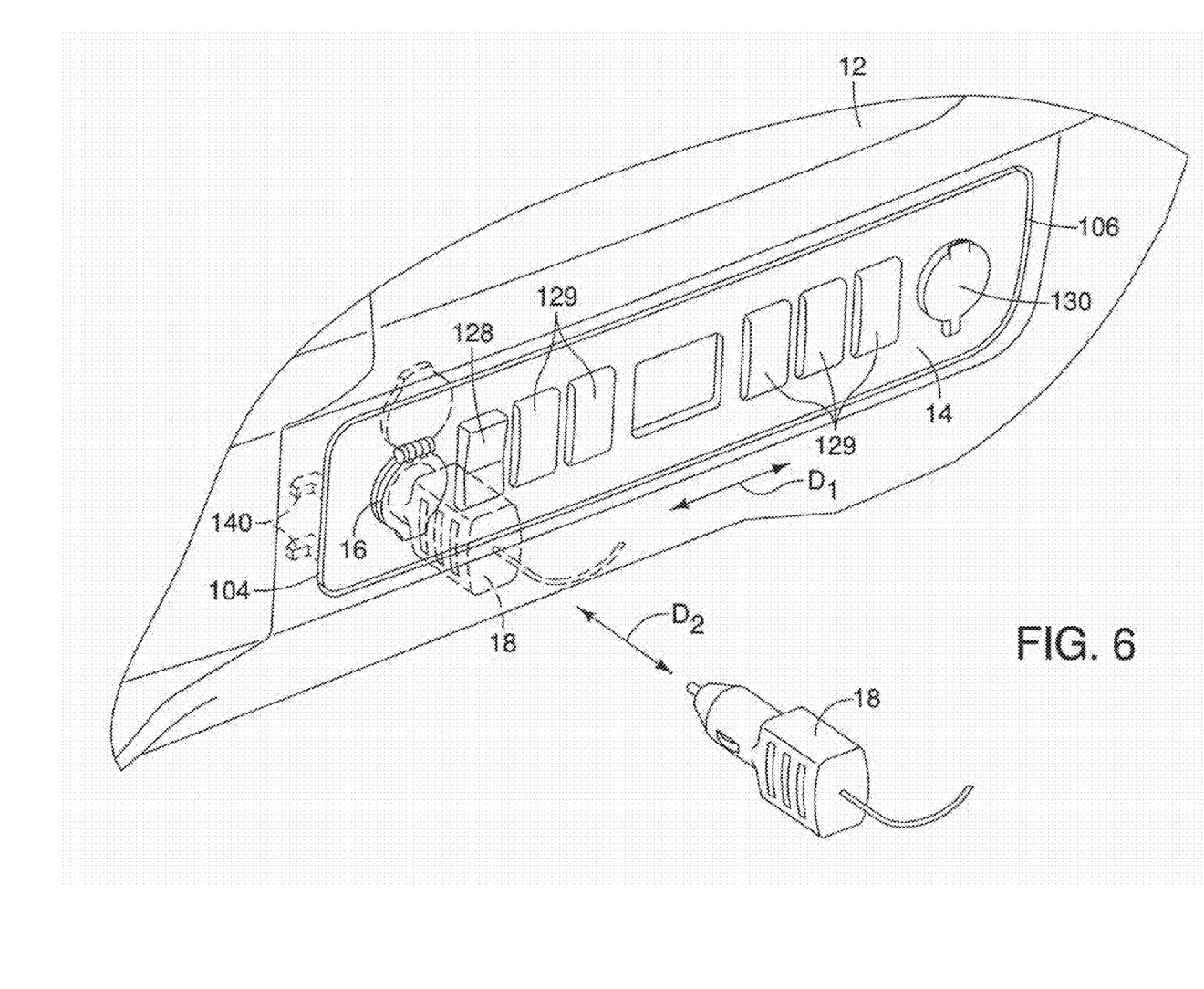
FIG. 6 is another perspective view of the vehicle interior assembly showing the trim panel installed to the vehicle interior assembly and showing a power adaptor that is installable in the electric power outlet in accordance with the present invention.

As best shown in FIG. 6, the power outlet 16 is dimensioned and configured to receive a power adaptor 18 of an electrically-powered accessory (not shown). The power adaptor 18 is insertable and removable from the power outlet 16. The action of inserting and removing the power adaptor 18 from the power outlet 16 results in appreciable levels of force being transmitted to the trim panel 14 and the interior panel portion 12. Consequently, the trim panel 14 and the interior panel portion 12 are designed and dimensioned to withstand those repeatedly applied forces, as described in greater detail below.

The power adaptor 18 can be an integral part of an accessory or may be a separate power supply that converts 12 volt power to another voltage for use with the accessory. Such accessories include, but are not limited to: a global positioning system (GPS); a mobile telephone power device or battery re-charger; handheld music playing devices; a portable reading light; and/or a power supply for a personal computer.

Referring again to FIG. 1, the vehicle interior assembly 10 is preferably a dashboard assembly that includes, for instance, an upper dashboard section 28, a steering column section 30, an instrument panel 32 adjacent to the steering column section 30, an environment control panel 34 at a central location below the upper dashboard section 28, the interior panel portion 12 and the trim panel 14. The vehicle interior assembly 10 is preferably a multi-layered assembly that includes a backing layer (not shown) made of a combination of metal material(s), composite materials, polymer or plastic material with an outer layer or layers that include a decorative covering and padding or is resilient material softer than the material that make up the backing layer.

The upper dashboard section 28 is preferably a padded region of the vehicle interior assembly 10 that has a contoured exposed surface. The steering column section 30 includes an aperture (not shown) through which a steering column extends. The instrument panel 32 is located adjacent to the steering column section 30 and includes various conventional instruments (not shown) such as a speedometer, odometer, tachometer and engine status-related gauges and lights. The environment control panel 34 includes conventional air conditioning, heating, fan and defrosting controls, and optionally a radio and/or CD player.

In the depicted embodiment, the interior panel portion 12 is a separate element of the vehicle interior assembly 10 that attaches to one or more of portions of the vehicle interior assembly 10. For example, the interior panel portion 12 is attached and fixedly secured to the steering column section 30 and the environment control panel 34. However, alternatively the interior panel portion 12 can be integrally formed as a single monolithic element with the environment control panel 34 and the vehicle interior assembly 10. Alternatively, the interior panel portion 12 and the environment control panel 34 can be molded together as a monolithic single element. However, it should be understood that the interior panel portion 12 and the vehicle interior assembly 10 can be manufactured in any of a variety of ways and still incorporate the features of the present invention, as described below.

As best shown in FIGS. 2-5, 7-9 and 11, the interior panel portion 12 includes an exposed surface 40 and a concealed surface 42 (FIGS. 5 and 7-9) when the interior panel portion 12 is installed to the vehicle interior assembly 10 within the passenger compartment P of a vehicle. The interior panel portion 12 further includes an opening 44 (FIGS. 3-5 and 7-9) that extends between the exposed surface 40 and the concealed surface 42, a recessed lip section 46 (FIGS. 3, 5 and 9) and a support section 48 (FIGS. 3-5, 7, 8 and 11).

Figure 3:
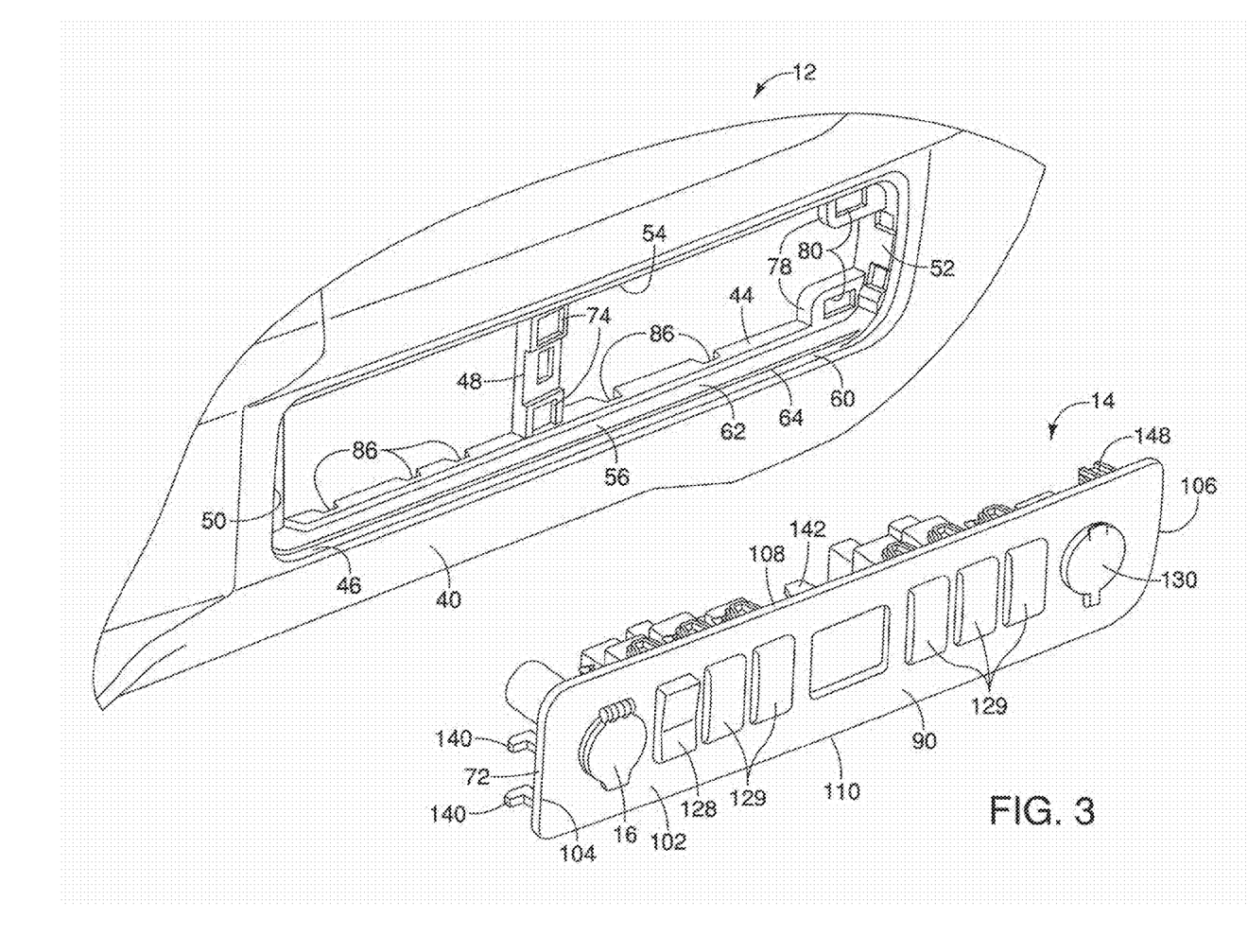
FIG. 3 is an exploded perspective view of the vehicle interior assembly showing features of an opening formed in the vehicle interior assembly and the trim panel uninstalled relative to the vehicle interior assembly in accordance with the present invention.
Figure 11:
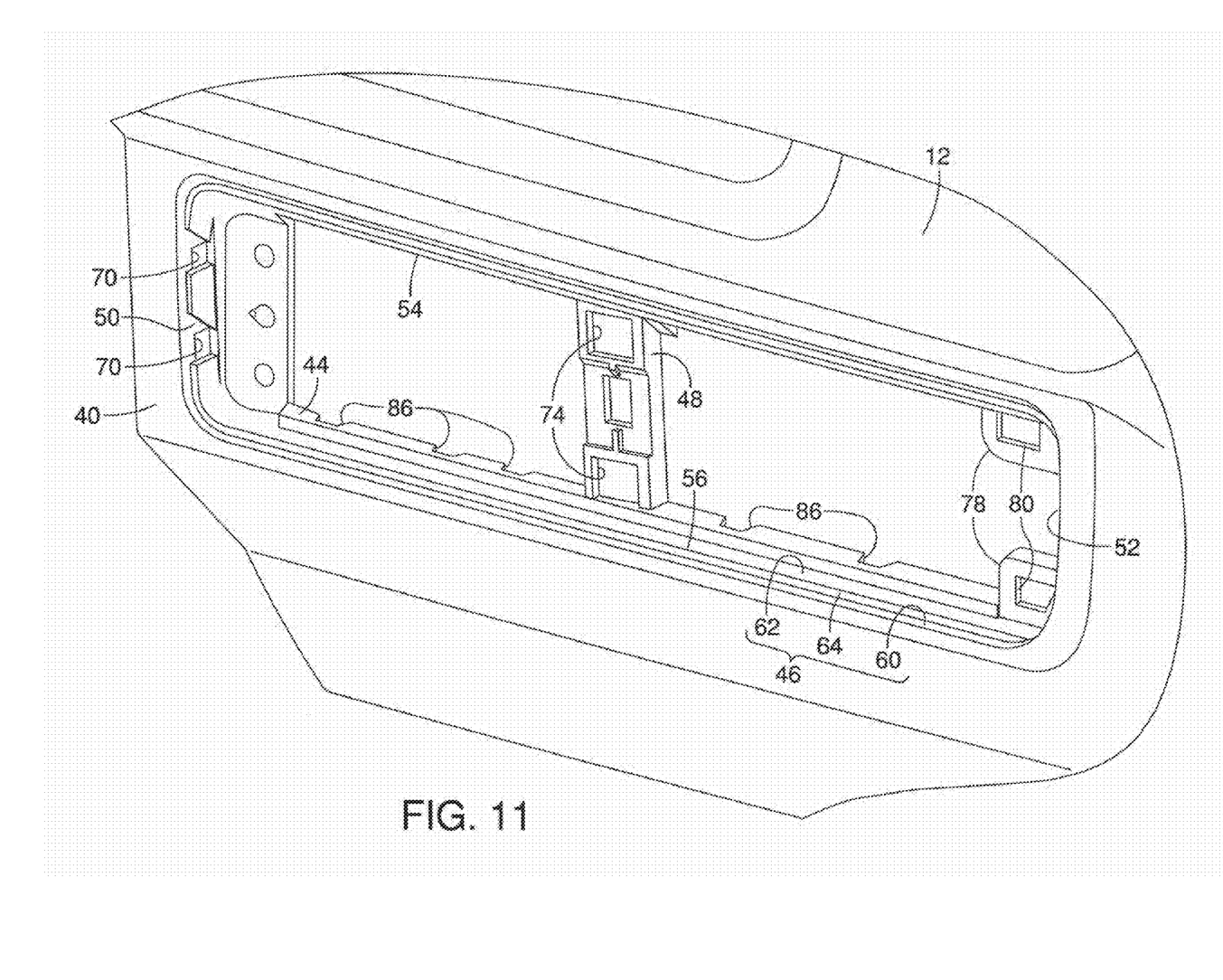
FIG. 11 is a perspective of the vehicle interior assembly showing details of the opening in accordance with the present invention.

As best shown in FIGS. 3, 5, 9 and 11, the recessed lip section 46 is a contoured region of the interior panel portion 12 that surrounds the opening 44. As best shown in FIGS. 3 and 11, the recessed lip section 46 includes a first side 50, a second side 52, a first longitudinal side 54 and a second longitudinal side 56. The first and second longitudinal sides 54 and 56 extend between the first side 50 and the second side 52. The first longitudinal side 54 defines an upper edge of the opening 44 and the second longitudinal side 56 defines a lower edge of the opening 44.

Figure 9:
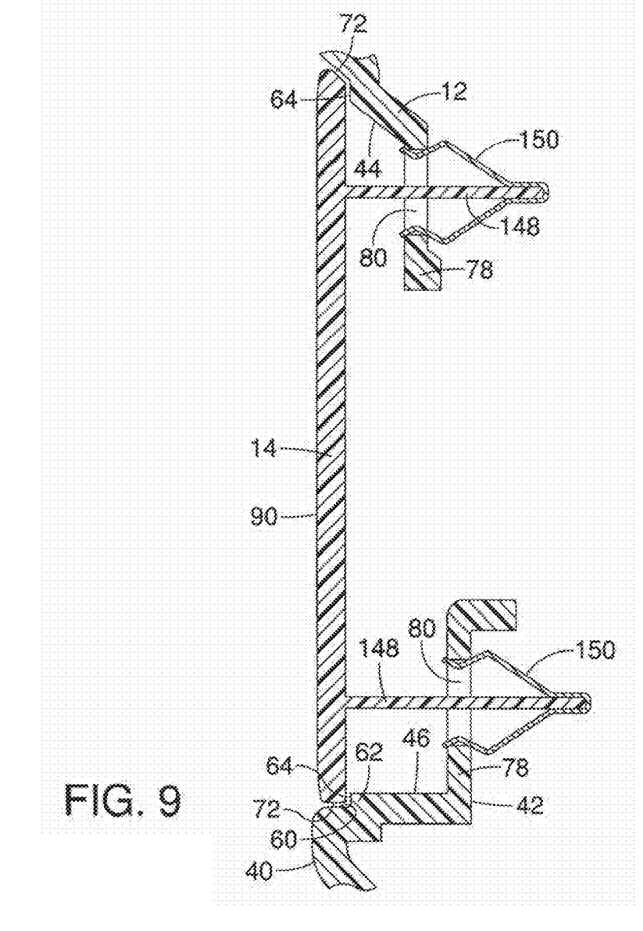
FIG. 9 is a cross-sectional view taken along the line 9-9 in FIG. 2 showing snap-fit parts of the trim panel installed to openings in the vehicle interior assembly in accordance with the present invention.

As best shown in cross-section in FIG. 9, the recessed lip section 46 further includes a first wall surface 60, a second wall surface 62 and a shoulder 64 defined between the first wall surface 60 and the second wall surface 62. As best shown in FIGS. 3 and 11, the first wall surface 60 extends completely around the recessed lip section 46 and around the opening 44. Further, the second wall surface 62 extends substantially all the way around the recessed lip section 46 and the opening 44, with several interruptions.

Specifically, the second wall surface 62 is interrupted at the first side 50 of the recessed lip section 46 by a pair of slots 70, as shown in FIG. 11. The purpose of the slots 70 is described in greater detail below.

Referring again to FIG. 9, the first wall surface 60 is offset from the second wall surface 62 thereby defining the shoulder 64 of the recessed lip section 46. The first wall surface 60, the second wall surface 62 and the shoulder 64 are dimensioned to prevent an outer periphery 72 (shown in FIG. 3) of the trim panel 14 from passing though the opening 44. More specifically, as indicated in FIG. 9, the outer periphery 72 of the trim panel 14 is dimensioned to mate with the shoulder 64 of the recessed lip section 46.

As best shown in FIGS. 3 and 11, the support section 48 traverses a mid-section of the opening 44. More specifically, the support section 48 extends between the first and second longitudinal sides 54 and 56, respectively. The support section 48 includes at least one aperture 74, whose purpose is described in greater detail below.

As best shown in FIG. 3, the second side 52 of the recessed lip section 46 includes mating parts 78 that extend from each of the corners of the second side 52 into the opening 44. In other words, the mating parts 78 extend towards one another from opposing portions of the second wall surface 62 at the second side 52 of the recessed lip section 46. Each of the mating parts 78 includes an aperture 80 whose purpose is described below.

Figure 7:
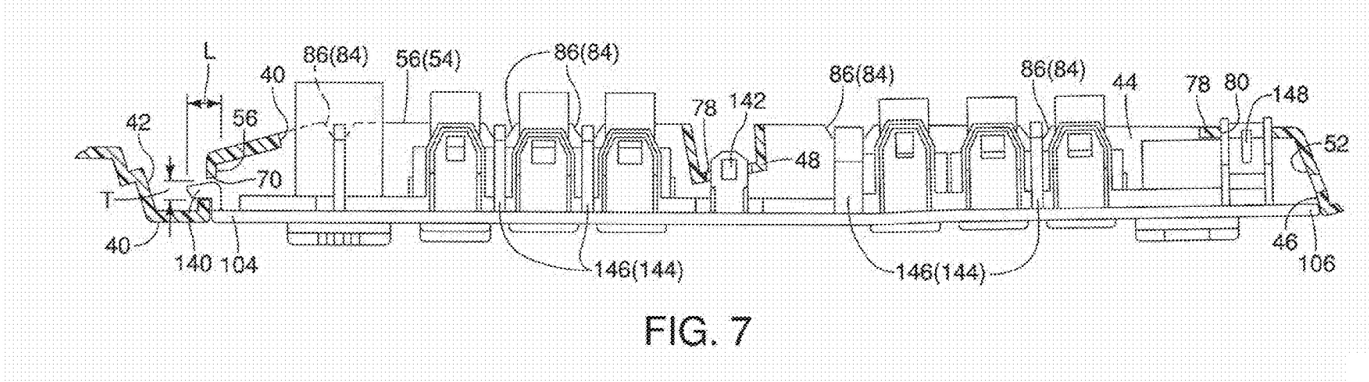
FIG. 7 is a cross-sectional view taken along the line 7-7 in FIG. 2 showing the trim panel installed to the vehicle interior assembly in accordance with the present invention.
Figure 8:
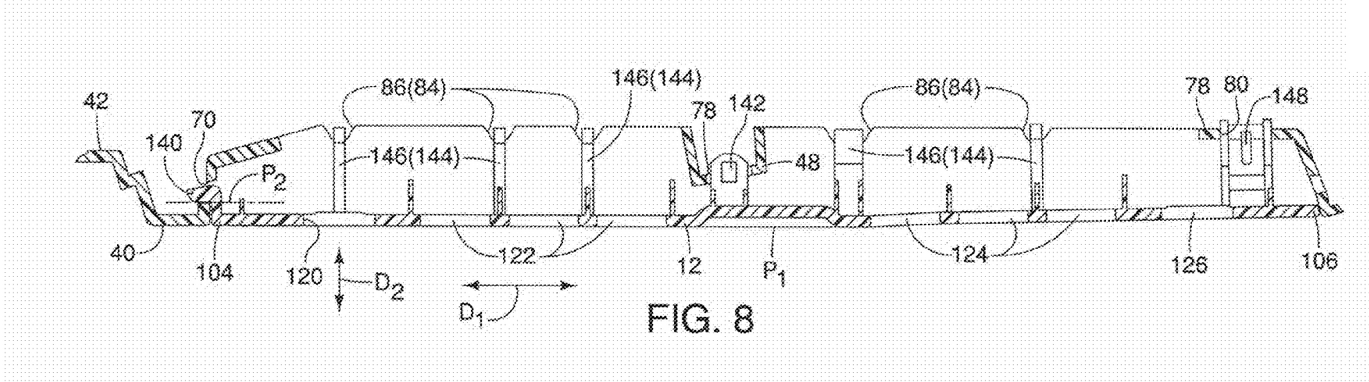
FIG. 8 is another cross-sectional view taken along the line 7-7 in FIG. 2 showing the trim panel installed to the vehicle interior assembly but with the electric power outlet and other accessory related hardware removed in accordance with the present invention.

As indicated in FIGS. 7 and 8, the first longitudinal side 54 includes a plurality of first recesses 84, whose purpose is described below. As best shown in FIGS. 3, 7, 8 and 11, the second longitudinal side 56 includes a plurality of second recesses 86, whose purpose is described below. It should be understood from the drawings and description herein, that the first recesses 84 and the second recesses 86 are aligned with one another. Consequently, the first longitudinal side 54 and the second longitudinal side 56 are essentially symmetrical to one another in overall shape.

Figure 4:
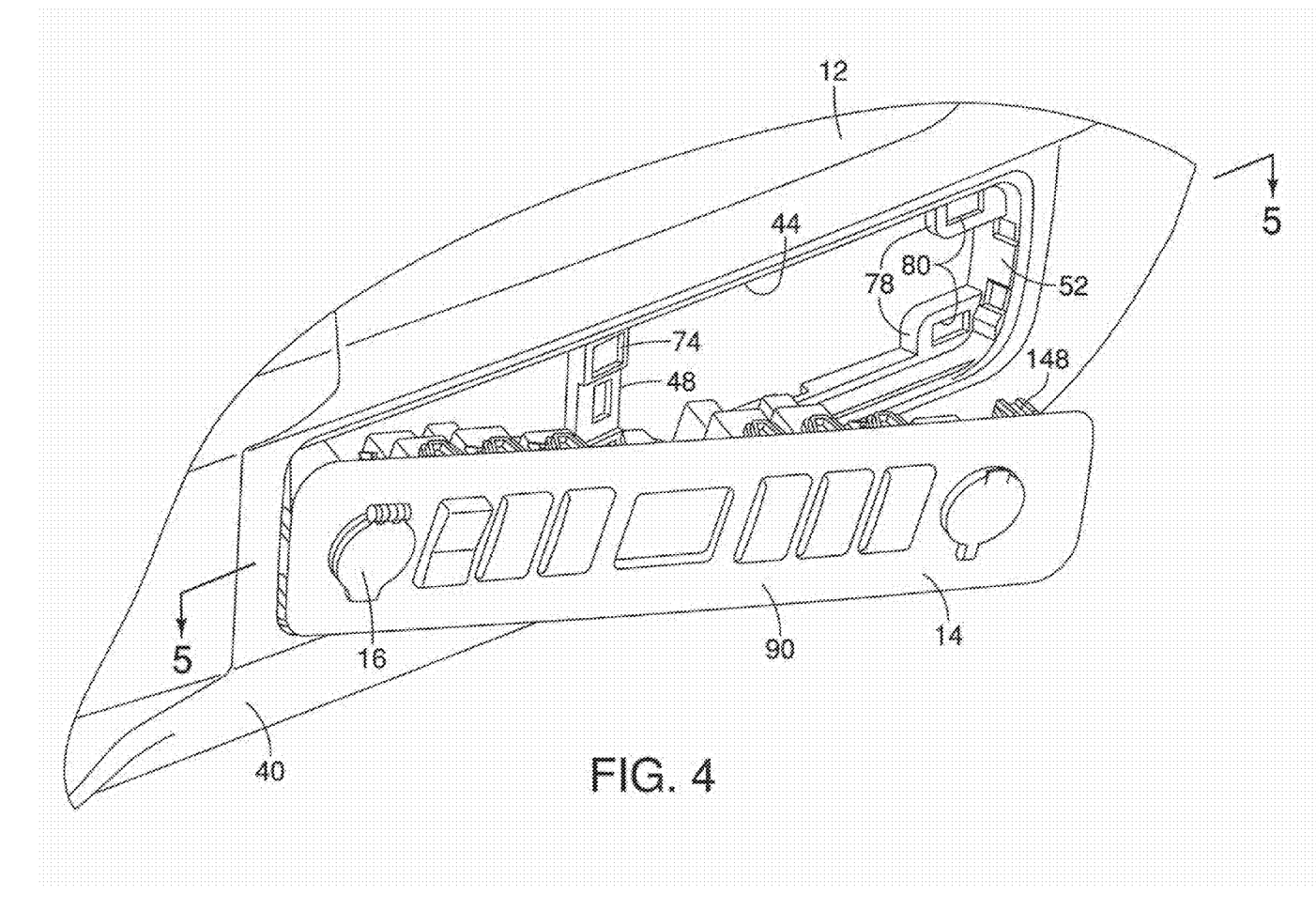
FIG. 4 is another perspective view of the vehicle interior assembly showing the trim panel partially installed to the vehicle interior assembly in accordance with the present invention.

A description of the trim panel 14 is now provided with specific reference to FIGS. 3-10. The trim panel 14 is configured to snap-fit into the opening 44 of the interior panel portion 12, as indicated in FIG. 4. The trim panel 14 is preferably made of one or more of the following: composite materials, polymer materials and plastic materials. The trim panel 14 can be formed as a monolithic unitary element with a contoured trim surface 90, or can be a multilayer assembly having a backing portion that is covered with a decorative material thereby defining the trim surface 90.

Figure 10:
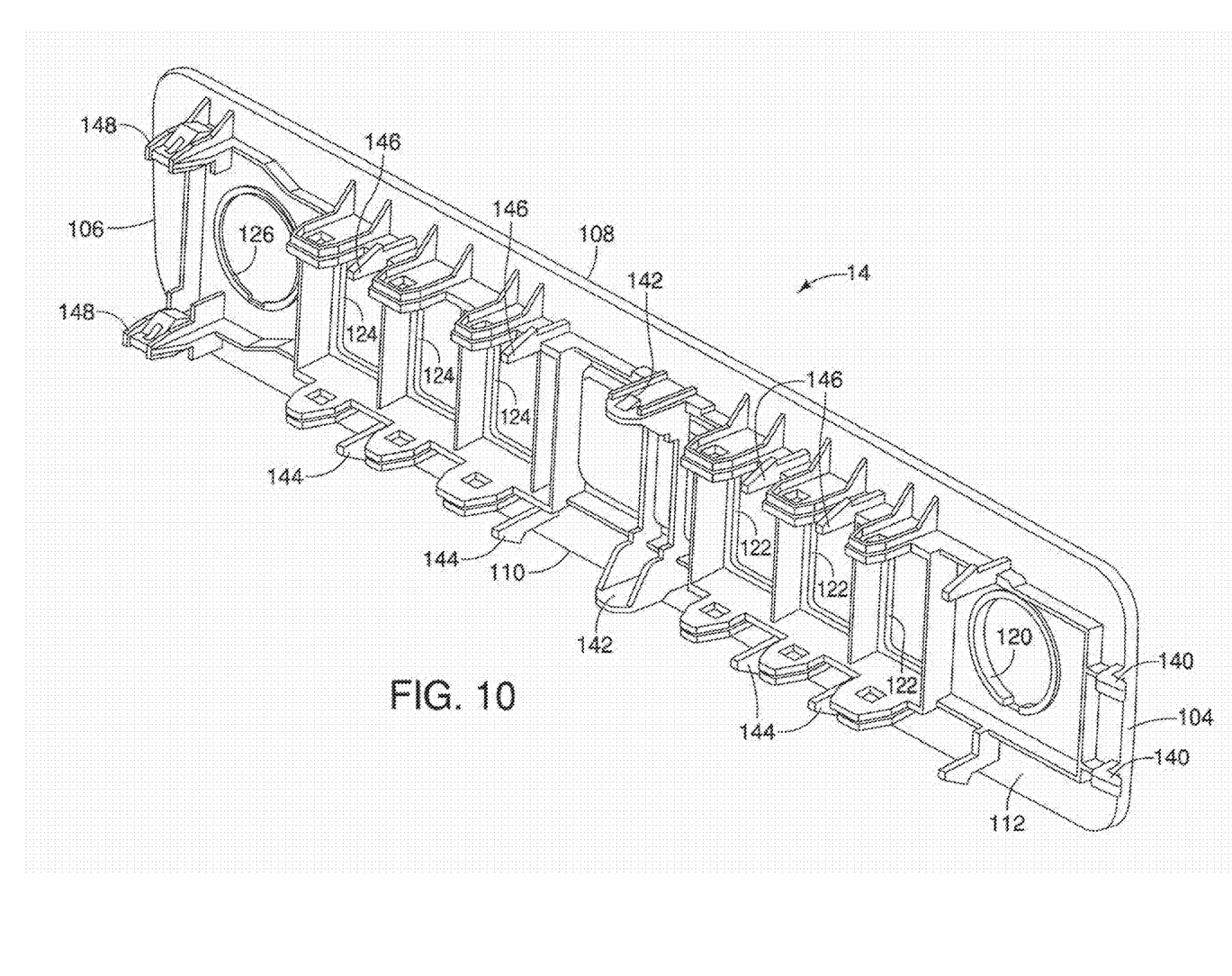
FIG. 10 is a perspective view of the trim panel shown removed from the vehicle interior assembly, showing a concealed side of the trim panel with the electric power outlet and other accessory related hardware removed in accordance with the present invention.

As best shown in FIG. 3, the trim panel 14 basically includes a main body 102 with the outer periphery 72 and having a first end 104, a second end 106, an upper edge 108, a lower edge 110, the trim surface 90 and a back surface 112 (shown in FIG. 10). As best shown in FIG. 8, the main body 102 of the trim panel 14 includes a plurality of openings 120, 122, 124 and 126. As shown in FIGS. 3, 6 and 7, the opening 120 is dimensioned to receive and support the electric power outlet 16, the openings 122 and 124 are dimensioned to receive and support, for example, switches 128 and indicator lights 129, and the opening 126 is dimensioned to receive and support a USB port 130.

As indicated in FIGS. 3 and 6-8, the main body 102 extends in a first direction $D_1$ between the first end 104 and the second end 106. As shown in FIG. 8, the opening 120 is located adjacent to the first end 104. Consequently, the electric power outlet 16 is located adjacent to the first end 104. As indicated in FIG. 6, the electric power outlet 16 is configured to receive the power adaptor 18 of the electrically powered accessory 20. Hence, as shown in FIGS. 6 and 8, the adapter 18 is insertable and removable from the electric power outlet 16 along a direction $D_2$ that is perpendicular to the first direction $D_1$ of the main body 102.

The main body 102 of the trim panel 14 includes several structural features that are configured to support the trim panel 14 to the interior panel portion 12. Specifically as best shown in FIG. 10, tile main body 102 of the trim panel 14 includes a pair of retention tabs 140 and a plurality of snap-fit parts 142, 144, 146 and 148.

As best shown in FIGS. 3 and 10, the retention tabs 140 extend along the back surface 112 and away from the first end 104 of the main body 102. As indicated in FIG. 6 and shown in FIGS. 7 and 8, with the trim panel 14 installed to the interior panel portion 12, the retention tabs 140 extend through the slots 70 and along a section of the concealed surface 42 of the interior panel portion 14 adjacent to the opening 44. Hence, the slots 70 adjacent to the first end 50 of the recessed lip section 46 (at the side of the opening 44) are each dimensioned to receive one of the retention tabs 140.

As shown in FIG. 7, the retention tabs 140 have a length L corresponding to the portion of the retention tabs 140 located along the section of the concealed surface 42 and a thickness T. The length L is at least 1.0 cm long and the thickness T is at least 4 mm. Hence, the retention tabs 140 preferably extend at least 1.0 cm beyond the first end 104 of the trim panel 14. The orientation of the retention tabs 140 in the slots 70 and the length L of the retention tabs 140 are for the purpose of preventing movement of the trim panel 14 in response to insertion and removal of the power adaptor 18 to and from the electric power outlet 16. The retention tabs 140 are further dimensioned to withstand at least 15 kilograms of force applied perpendicularly to the first direction $D_1$ of the main body 102 when the accessory adaptor 18 is removed from the accessory opening 102 and the power outlet 16.

As indicated in FIG. 8, the trim surface 90 of the trim panel 14 defines a first plane $P_1$. As is also indicted in FIG. 8, the retention tabs 140 have a longitudinal surface that defines second plane $P_2$ that is spaced apart from the first plane $P_1$ such that the retention tabs 140 extend approximately parallel to the first plane $P_1$.

As best shown in FIG. 8, the plurality of snap-fit parts 142, 144, 146 and 148 all extend from the back surface 112. Each of the snap-fit parts 142, 144 and 146 includes a projecting resilient tip that forms part of the snap-fit, as described below.

As shown in FIGS. 7, 8 and 10, the snap-fits parts 142 extend from a central portion of the main body 102 perpendicularly from the plane $P_1$, as indicated in FIG. 8. Both of the snap-fit parts 142 are wider than each of the snap-fit parts 144 and 146. The snap-fit parts 142 are dimensioned to extend through the apertures 74 in the support section 48, with the trim panel 14 installed to the interior panel portion 12.

The snap-fits parts 144 extend approximately perpendicularly from the back surface 112 and perpendicularly from the first plane $P_1$ adjacent to the lower edge 108 of the main body 102. The snap-fit parts 144 are dimensioned and positioned to snap-fit to the recesses 86 formed in the second longitudinal side 56 of the recessed lip section 46 with the trim panel 14 installed to the interior panel portion 12.

The snap-fit parts 146 extend approximately perpendicularly from the back surface 112 and perpendicularly from the first plane $P_1$ adjacent to the upper edge 110 of the main body 102 with the trim panel 14 installed to the interior panel portion 12. The snap-fit parts 146 are dimensioned and positioned to snap-fit to the recesses 84 formed in the first longitudinal side 54 of the recessed lip section 46 with the trim panel 14 installed to the interior panel portion 12.

The snap-fit parts 148 are wider than the snap-fit parts 144 and 146 and are located proximate the second end 106 of the main body 102 of the trim panel 14. As best shown in FIG. 9, the snap-fit parts 148 extend perpendicularly to the plane $P_1$ and include metallic clips 150. The metallic clips 150 of the snap-fit parts 148 releasably secure the snap-fit parts 148 to the mating parts 78 of the interior panel portion 12. Specifically, the snap-fit parts 148 and the clips 150 extend through the apertures 80 of the mating parts 78 releasably securing the trim panel 14 to the interior panel portion 12 with the trim panel 14 installed to the interior panel portion 12. Further, the trim panel 14 is configured and dimensioned such that with the retention tabs 140 arranged within the slots 70, the snap-fit parts 148 align with the apertures 80 of the mating parts 78 of the interior panel portion 12.

Figure 5:
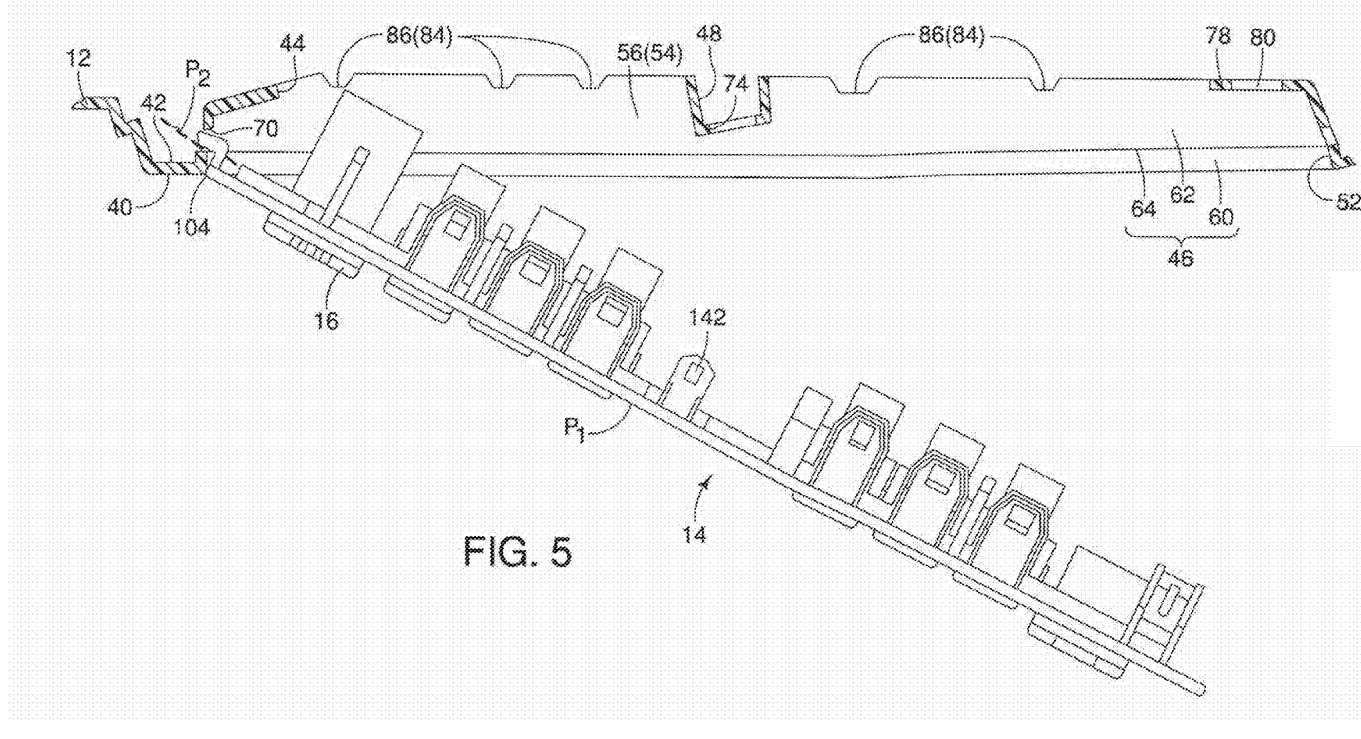
FIG. 5 is a cross-sectional view taken along the line 5-5 in FIG. 4 showing the trim panel partially installed to the vehicle interior assembly in accordance with the present invention.

The vehicle interior structure 10 is assembled in a specific manner. Specifically, the power outlet 16 (an accessory outlet) is installed to the opening 120 of the main body 102 proximate the first end 104 of the trim panel 14, as shown in FIG. 3. Next, the retention tabs 140 of the trim panel 14 are inserted into the slots 70 of the recessed lip section 46 of the interior panel portion 12, with the retention tabs 140 of the trim panel 14 being formed adjacent the first end 104 of the trim panel 14, as indicated in FIGS. 4 and 5. Next, the trim panel 14 is pivoted such that the retention tabs 140 restrict movement of the first end 104 of the trim panel 14 relative to the interior panel portion 12 to bring the second end 106 of the trim panel 14 towards the opening 44 in the interior panel portion 12, as indicated in FIG. 7. At that time, the trim panel 14 is snap-fitted to the interior panel portion 12 with the snap-fit parts 142 becoming engaged the apertures 74 of the support section 48; with the snap-fit parts 144 and 146 becoming engaged with the recesses 86 and 84, respectively; and with the snap-fit parts 148 becoming engaged with the apertures 80 of the mating parts 78.

The various parts of the vehicle (not shown) and the passenger compartment P are conventional components that are well known in the art. Since vehicles and passenger compartments P are well known in the art, these structures will not be discussed or illustrated in detail herein. Rather, it will be apparent to those skilled in the art from this disclosure that the components can be any type of structure that can be used to carry out the present invention.

GENERAL INTERPRETATIONS OF TERMS

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other call have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle interior assembly comprising:
an interior panel portion having an exposed surface and a concealed surface when the interior panel portion is installed within a passenger compartment, the interior panel portion including an opening and a mating part; and
a trim panel snap-fitted into the opening of the interior panel portion, the trim panel including
a main body that extends in a first direction between a first end and a second end opposite the first end of the main body;
an accessory opening provided in the main body adjacent to the first end, the accessory opening being configured to receive an accessory adaptor of a vehicle accessory that is insertable and removable from the accessory opening perpendicularly to the first direction of the main body;
a retention tab extending parallel to the first direction away from the first end and beyond an adjacent peripheral edge of the first end, the retention tab further extending along a section of the concealed surface of the interior panel portion adjacent to the opening for preventing movement of the trim panel perpendicularly to the first direction of the main body in response to at least one of insertion and removal of the accessory adaptor; and
a snap-fit part releasably secured to the mating part of the interior panel portion.
2. The vehicle interior assembly according to claim 1, wherein
the snap-fit part extends approximately perpendicularly to the first direction of the main body.
3. The vehicle interior assembly according to claim 1, wherein
the interior panel portion includes a recessed lip section that at least partially surrounds the opening, the recessed lip section having a first end defining a first edge of the opening and a second end opposite the first end defining a second edge of the opening, the recessed lip section being dimensioned to prevent an outer periphery of the trim panel from passing though the opening.
4. The vehicle interior assembly according to claim 3, wherein
the recessed lip section includes a slot proximate the first edge of the opening dimensioned to receive the retention tab.
5. The vehicle interior assembly according to claim 4, wherein
the recessed lip section includes the mating part proximate the second edge of the opening, the mating part having an aperture dimensioned to retain the snap-fit part.
6. The vehicle interior assembly according to claim 4, wherein
the retention tab is arranged with respect to the slot such that when the retention tab is disposed in the slot the snap-fit part aligns with the mating part of the interior panel portion.
7. The vehicle interior assembly according to claim 3, wherein
the recessed lip section includes a top longitudinal portion and a bottom longitudinal portion extending between the first and second ends thereof, the top and bottom longitudinal portions each having a plurality of recesses, and
the snap-fit part includes a plurality of flexible tabs extending from a back surface of the trim panel facing away from the passenger compartment, the plurality of recesses being dimensioned to retain the flexible tabs with the trim panel installed to the interior panel portion.

8. The vehicle interior assembly according to claim 1, wherein
the main body of the trim panel has a trim surface exposed to the passenger compartment with the trim panel installed to the interior panel portion, the trim surface defining a first plane, and
the retention tab having a longitudinal surface defining a second plane that is spaced apart from the first plane such that the retention tab extends approximately parallel to the first plane.

9. The vehicle interior assembly according to claim 8, wherein
the snap-fit part extends from the second end of the main body in a direction perpendicular to the first plane.

10. The vehicle interior assembly according to claim 1, wherein
the trim panel includes a pair of retention tabs dimensioned to withstand at least 15 kilograms of force applied perpendicularly to the first direction of the main body when the accessory adaptor of the vehicle accessory is removed from the accessory opening.

11. The vehicle interior assembly according to claim 1, wherein
the retention tab extends at least 1.0 cm beyond the first end of the main body of the trim panel.

12. The vehicle interior assembly according to claim 1, wherein
the interior panel portion includes a support section that traverses a mid-section of the opening, and
the trim panel includes a flexible tab extending into an aperture in the support section when the trim panel is installed to the interior panel portion.

13. A vehicle interior assembly comprising
an interior panel portion having an exposed surface and a concealed surface when the interior panel portion is installed within a passenger compartment, the interior panel portion including an opening and a mating part;
a trim panel snap-fitted into the opening of the interior panel portion, the trim panel including
a main body that extends in a first direction between a first end and a second end opposite the first end of the main body;
an accessory opening provided in the main body adjacent to the first end, the accessory opening being configured to receive an accessory adaptor of a vehicle accessory that is insertable and removable from the accessory opening perpendicularly to the first direction of the main body;
a retention tab extending away from the first end and along a section of the concealed surface of the interior panel portion adjacent to the opening for preventing movement of the trim panel perpendicularly to the first direction of the main body in response to at least one of insertion and removal of the accessory adaptor; and
a snap-fit part releasably secured to the mating part of the interior panel portion; and an electric power outlet mounted to the main body extending through the accessory opening and being configured to receive the accessory adaptor through the accessory opening, and the accessory adaptor being a power adaptor of an electrically powered accessory.

14. A method of assembling a vehicle interior structure comprising:
installing an accessory outlet to an accessory opening formed in a trim panel proximate a first end of the trim panel, the accessory outlet being an electric power outlet;
inserting a retention tab of the trim panel into a slot of a recessed section of an interior panel, with the retention tab of the trim panel being formed adjacent the first end of the trim panel;
pivoting the trim panel such that the retention tab restricts movement of the first end of the trim panel relative to the interior panel to bring a second end of the trim panel towards an opening in the interior panel; and
snap-fitting the trim panel to the interior panel.

15. The vehicle interior assembly according to claim 13, wherein
the snap-fit part extends approximately perpendicularly to the first direction of the main body.

16. The vehicle interior, assembly according to claim 13, wherein
the interior panel portion includes a recessed lip section that at least partially surrounds the opening, the recessed lip section having a first end defining a first edge of the opening and a second end opposite the first end defining a second edge of the opening, the recessed lip section being dimensioned to prevent an outer periphery of the trim panel from passing though the opening.

17. The vehicle interior assembly according to claim 16, wherein
the recessed lip section includes a slot proximate the first edge of the opening dimensioned to receive the retention tab.

18. The vehicle interior assembly according to claim 13, wherein
the main body of the trim panel has a trim surface exposed to the passenger compartment with the trim panel installed to the interior panel portion, the trim surface defining a first plane, and
the retention tab having a longitudinal surface defining a second plane that is spaced apart from the first plane such that the retention tab extends approximately parallel to the first plane.

19. The vehicle interior assembly according to claim 13, wherein
the interior panel portion includes a support section that traverses a mid-section of the opening, and
the trim panel includes a flexible tab extending into an aperture in the support section when the trim panel is installed to the interior panel portion.

20. The vehicle interior assembly according to claim 1, wherein
the trim panel is formed as a monolithic unitary member.

* * * * *